(12) United States Patent
Dickinson

(10) Patent No.: US 7,628,260 B2
(45) Date of Patent: Dec. 8, 2009

(54) CONTROL SYSTEM AND METHOD FOR LOCK UP CLUTCH

(75) Inventor: Michael Thomas Dickinson, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 271 days.

(21) Appl. No.: 11/460,799

(22) Filed: Jul. 28, 2006

(65) Prior Publication Data

US 2008/0026905 A1  Jan. 31, 2008

(51) Int. Cl.
*F16H 61/14* (2006.01)

(52) U.S. Cl. ............... 192/3.29; 192/221; 192/13 R

(58) Field of Classification Search .......... 477/53, 477/62, 170, 171, 172
See application file for complete search history.

(56) References Cited

U.S. PATENT DOCUMENTS

| | | | |
|---|---|---|---|
| 4,676,353 A | 6/1987 | Matsuda | |
| 4,825,989 A | 5/1989 | Frigger | |
| 4,899,279 A | 2/1990 | Cote et al. | |
| 5,056,637 A | 10/1991 | Miyawaki et al. | |
| 5,343,990 A * | 9/1994 | Iizuka | 192/3.31 |
| 5,477,456 A | 12/1995 | Fennel et al. | |
| 6,170,923 B1 | 1/2001 | Iguchi et al. | |
| 6,183,391 B1 | 2/2001 | Iijima | |
| 6,480,771 B2 | 11/2002 | Nishida et al. | |
| 6,846,268 B2 | 1/2005 | Schmitt | |
| 2002/0162722 A1 | 11/2002 | Suzuki et al. | |
| 2004/0140174 A1 | 7/2004 | Kano et al. | |
| 2005/0020404 A1 | 1/2005 | Claar et al. | |

FOREIGN PATENT DOCUMENTS

| | | | |
|---|---|---|---|
| EP | 1226993 A1 * | 7/2002 | |
| JP | 2227342 | 9/1990 | |
| JP | 2002243032 | 8/2002 | |

* cited by examiner

*Primary Examiner*—Richard M. Lorence
(74) *Attorney, Agent, or Firm*—Cermak Kenealy Vaidya & Nakajima LLP; Mark E. Duell

(57) ABSTRACT

A lock-up clutch control method and apparatus controls a lock-up state of a torque converter interposed between a drive unit and a transmission on a vehicle. Data indicative of the operating condition of an antilock braking system can be provided as input to the control method and apparatus and affect the lock-up state of the torque converter.

20 Claims, 2 Drawing Sheets

CONTROL SYSTEM AND METHOD FOR LOCK UP CLUTCH

BACKGROUND

1. Field

A lock-up clutch control method and apparatus is described for controlling a lock-up state of a torque converter interposed between a drive unit and a transmission on a vehicle. Data indicative of the operating condition of an antilock braking system can be provided as input to the control method and apparatus.

SUMMARY

According to one aspect of the disclosed subject matter, a transmission lock-up clutch control can be used to improve fuel economy and engine efficiency. The lock-up clutch control can be applied during downshifting and at closed throttle. In one specific embodiment, the clutch control can be applied during fifth to fourth stopping downshift of the vehicle transmission. In other words, the clutch control can take place during downshifting from the lowest gear ratio (possibly an overdrive gear ratio, e.g., fifth gear) to the second lowest gear ratio (e.g., fourth gear).

In certain circumstances (such as during downshifting, during a closed throttle condition, while cruising, and other vehicle conditions), lock-up clutch control pressure can be increased in order to limit the torque converter over-slip caused by engine braking. However, under this condition, if the antilock braking system (ABS) is not functioning properly, and the brakes are applied enough to lock the wheels, the increased lock-up clutch pressure can cause the engine to stall.

A controller that utilizes software logic (and/or hardware systems) which considers the ABS condition (proper or improper function) and conditionally modifies the lock-up clutch pressure during shifting. If the ABS function is proper, no modification to lock-up control pressure is necessarily made. If the ABS is functioning improperly, the lock-up clutch control pressure request can be reduced, possibly to zero.

According to another aspect of the disclosed subject matter, a system can be provided for controlling a power train of a vehicle. The system can include a drive unit, a transmission, the transmission having an input and an output, the output of the transmission operatively coupled to wheels on the vehicle (e.g., relative motion can be transmitted between the output and the at least one wheel—intermediate connection and other devices may be present between the output and the at least one wheel), the wheels being provided with brakes, and a torque converter having an input operatively coupled to the drive unit and an output operatively coupled to the input of the transmission. The torque converter can be provided with a lock-up clutch, and the lock-up clutch. A lock-up clutch control device, such as a pressure regulator, solenoid, or other control device can be provided to adjust the amount of locking for the lock-up clutch upon receipt of a control signal. The vehicle can also be provided with an antilock braking system, wherein the antilock braking system can prevent locking of the wheels on the vehicle during application of the brakes to the wheels when the antilock braking system is functioning properly. A controller can be provided to determine whether a condition is present in which the antilock braking system is not functioning properly, and upon determination that the antilock braking system is not functioning properly and that the wheels are capable of locking during application of the brakes to the wheels, the controller can control the lock-up clutch control pressure regulator to reduce lock-up clutch control pressure.

The controller can control the lock-up clutch control pressure regulator to achieve a lock-up clutch control pressure equal to zero upon determination that a condition is present in which the antilock braking system is not functioning properly and the wheels are locked during application of the brakes to the wheels.

According to another aspect of the disclosed subject matter, the controller can determine whether the antilock braking system is working properly during shifting of gears in the transmission.

Furthermore, the controller can determine whether the antilock braking system is working properly during a downshift of gears in the transmission. The ABS system can include the capability of detecting functionality during downshifting of the transmission, but it can also detect functionality in various other situations. The detection system hardware may include but is not limited to: the controller, wheel speed sensors, a vehicle yaw rate sensor, and a steering angle sensor. If any of the signals from each sensor are out of a specified range, it is possible to detect an ABS failure. If the signals are not consistent with each other, it may also detect failure. For example, if the yaw rate and steering angle signals suggest that the vehicle is making a right-hand turn but the wheel speed sensors are consistent with a left-hand turn, the system may detect a failure.

The controller can determine whether the antilock braking system is working properly during a downshift of gears in the transmission with the vehicle in a coasting condition.

One or more sensors can be operatively associated with the antilock braking system and adapted to output data indicative of proper and/or improper operation of the antilock braking system, and the controller. The controller can be a typical automotive electronic control unit (ECU) with input from various sensors and control outputs. The controller can include hardware and/or software capable of receiving data from the one or more sensors, processing the data, and utilizing the results of the processing of the data to send a control signal to the lock-up clutch control pressure regulator. The hardware and/or software of the controller can be configured in one embodiment to reduce the lock-up clutch control pressure only during downshifting (a time when the control pressure is typically relatively high) and when the ABS is not functioning properly. If the ABS is not functioning properly, one embodiment of the software/hardware for the controller can be configured to assume that the ABS will continue to function improperly until the system is serviced. It is not assumed that the ABS will detect functionality at the instance of downshifting. The control signal can cause the lock-up clutch control pressure regulator to reduce lock-up clutch control pressure, either partially, or entirely to zero, thereby partially, or completely releasing the lock-up clutch. The controller can control the lock-up clutch control pressure during a coasting condition of the vehicle, maintaining sufficient lock-up clutch control pressure in order to limit torque converter over-slip caused by engine braking, but releasing lock-up clutch control pressure sufficiently to prevent engine stalling under conditions such as when the antilock braking system fails and the brakes begin to lock up on a low friction road surface or under other conditions.

According to another aspect of the disclosed subject matter, a method of controlling the power train of a vehicle can include providing a drive unit, a transmission, the transmission having an input and an output, the output operatively coupled to wheels on the vehicle, the wheels having brakes, a torque converter having an input operatively coupled to the drive unit and an output operatively coupled to the input of the transmission, the torque converter having a lock-up clutch, a lock-up clutch control pressure regulator, an antilock braking system, the antilock braking system preventing locking of the wheels on the vehicle during application of the brakes to the wheels when the antilock braking system is functioning properly and a system controller.

The method can include determining with the system controller whether a condition is present in which the antilock braking system is not functioning properly, and controlling the lock-up clutch control pressure regulator to reduce lock-up clutch control pressure upon determination that the antilock braking system is not functioning properly and that the wheels are capable of locking during application of the brakes to the wheels.

The method can include controlling the lock-up clutch control pressure regulator to produce a lock-up clutch control pressure equal to zero upon determination that a condition is present in which the antilock braking system is not functioning properly and the wheels are locked during application of the brakes to the wheels.

Still other features will become apparent to those skilled in the art from a reading of the following detailed description of embodiments constructed in accordance therewith, and taken in conjunction with the accompanying drawings.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
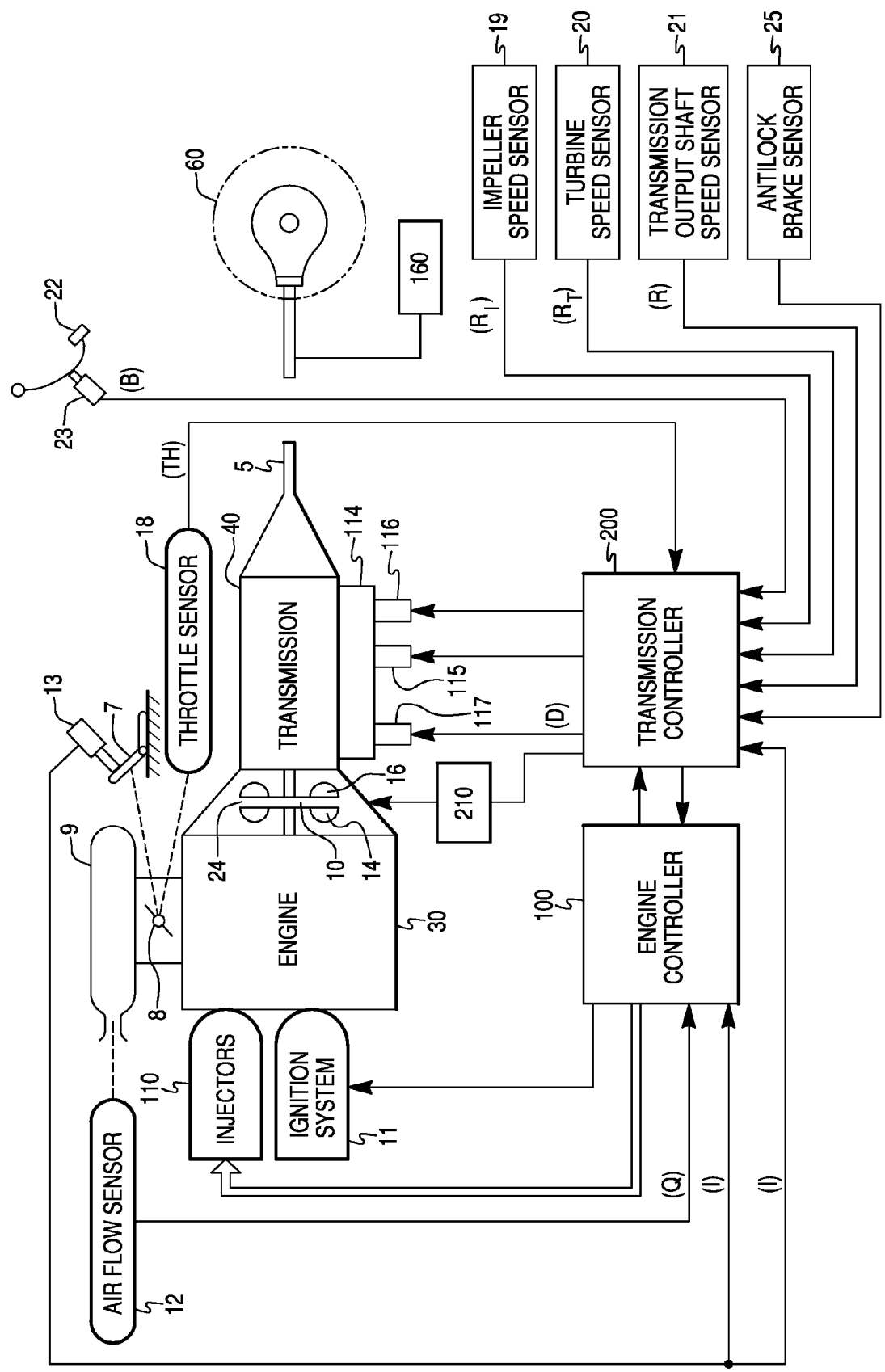
FIG. 1 is a block diagram showing the relationship between controllers, sensors, and a torque converter in a vehicle drive train.

Referring to FIG. 1, a drive train of a vehicle can include a drive unit 30, a torque converter 10 for multiplying torque and/or absorbing torque fluctuations, a lock-up clutch 24 operatively associated with the torque converter 10, an automatic transmission 40, wheels 60, brakes operatively associated with the wheels, and an antilock braking system 160 for preventing locking of the brakes that could lead to loss of control of the vehicle. The torque converter 10 conducts power transmission between the input element 14 and output element 16 via an operating fluid, and thus suffers from relatively low transmission efficiency and unsatisfactory fuel consumption. In order to overcome these problems, the torque converter is a lock-up type torque converter 10 wherein the input element 14 and output element 16 can be coupled by engaging the lock-up clutch 24 in a traveling condition when a torque multiplying function and/or torque-fluctuation absorbing function are not required.

FIG. 1 illustrates the torque converter 10 situated between an internal combustion engine 30 as the drive unit, and the automatic transmission 40. The torque converter 10 can include, as the input element 14, a pump impeller connected to an output shaft of the engine 30 and, as the output element 16, a turbine runner connected to a turbine shaft. The turbine shaft serves as an input shaft of the transmission 40. The transmission 40 includes an output shaft 5 drivingly connected to the vehicle driving wheels 60. The engine torque is transmitted to the pump impeller. The pump impeller accelerates oil inside of the torque converter 10 towards the turbine runner and the oil at the turbine exit is redirected over a stator into the pump impeller, thereby achieving a torque multiplication effect. The torque is delivered by torque delivery elements of the transmission 40 to the transmission output shaft 5. The transmission 40 can include ratio control means operative to establish various speed ratios between the input shaft and the output shaft 5. The transmission 40 can be a continuously variable transmission (CVT), such as that described in U.S. Pat. No. 5,697,866 issued to Okahara, which U.S. Pat. No. 5,697,866 is hereby incorporated by reference in its entirety. In an alternative embodiment, the transmission 40 can be a multiple discrete ratio transmission, in which two shift solenoids are activated or deactivated to trigger movement of shift valves to establish a plurality of speed ratios between the input and output shafts.

The engine 30 can be provided with a throttle valve 8, which opens in degrees in response to manual depression of an accelerator or gas pedal 7 by an operator. The engine 30 draws in air via an air cleaner 9 at a flow rate that is determined by the throttle opening degree and the engine speed. The engine 30 can be provided with fuel injectors 110 arranged for cylinders, respectively, and an ignition system 11. A microprocessor based engine controller 100 controls the fuel injectors 110 and the ignition system 11. The engine controller 100 inputs information based on a sensor signal Q from an air flow sensor 12 and a signal I from a coasting switch 13. The air flow sensor 12 detects intake air flow admitted to the engine cylinders and generates the sensor signal indicative of the detected intake air flow. The coasting switch 13 is positioned adjacent the accelerator pedal 7. The coasting switch 13 is normally turned off and turned on only when the accelerator pedal 7 is released. Thus, the signal I is at a high level when the coasting switch 13 is turned on and a low level when it is turned off.

The engine controller 100 can process input information and determine the fuel quantity for injection by each of the injectors 110 into the corresponding one cylinder in accordance with various operating conditions of the engine 30. The engine controller 100 can also be provided with a fuel cut control strategy. According to a fuel cut control strategy, the engine controller can suspend supply of fuel to the injectors 110 when the vehicle is in a coasting status. Based on the various kinds of information, the engine controller 100 can adjustably control the ignition timing for generation of a spark at each spark plug by the ignition system 11 in response to various operating conditions of the engine 30. Thus, the combustion within each of the engine cylinders can be optimized in response to the engine's various operating conditions, and the fuel cut operation can be conducted in a predetermined manner when the vehicle is in a coasting status. Fuel supply can be restored to the injectors if the engine speed drops below a certain value in order to prevent engine stall.

The transmission 40 can include a hydraulic control valve assembly 114. In one embodiment, the transmission 40 can be in the form of a CVT, the hydraulic control valve assembly can include a first solenoid 115, a second solenoid 116 and a lock-up solenoid 117.

The first solenoid 115, can be a pressure modifier solenoid that generates a signal pressure applied to a pressure modifier valve. The duty cycle of the pressure modifier solenoid 115 can be adjusted to alter the magnitude of the signal pressure. The pressure modifier valve can generate modifier pressure variable in response to the signal pressure. The modifier pressure can be applied to a line pressure regulator valve. The line pressure regulator valve can generate line pressure variable in response to the modifier pressure.

The torque converter 10 can include a lock-up clutch 24. Altering the duty cycle of the lock-up solenoid 117 can control the engagement of the lock-up clutch 24. Within a lock-up region when the torque multiplication and torque variation absorption are not demanded on the torque converter 10, the lock-up clutch 24 can be engaged. When conditions such as failure of an antilock braking system are detected inside the lock-up region, thereby creating a condition wherein engine stall may occur, the lock-up clutch 24 can be released. A lock-up clutch control device 210, such as a lock-up clutch pressure regulator, solenoid 117, or other control structure, can be operatively connected to the controller 100 and the lock-up clutch 24 such that the control device 210 can receive a control signal from the controller 100 and accordingly adjust the lock-up clutch engagement status from zero to full engagement status, including locations of intermediate engagement status, depending on the contents of the control signal.

Alternative embodiments can include a lock-up clutch control pressure regulator, which can be controlled by a controller such as the transmission controller 200 in order to reduce the lock-up clutch pressure partially or entirely to result in partial or complete release of the lock-up clutch.

Engagement of the lock-up clutch 24 causes the torque converter 10 to assume a lock-up state in which the input element 14 and output element 16 are interconnected. Release of the lock-up clutch 24 causes the torque converter 10 to assume a converter state in which torque multiplication and torque variation absorption effects are provided.

Continuing to refer to FIG. 1, a transmission controller 200 can control the solenoids 115, 116 and the duty cycle D of the lock-up solenoid 117. The transmission controller 200 can input information based on signal I from the coasting switch 13, a throttle position signal TH from a throttle sensor 18, a signal from an antilock braking sensor 25, a pulse signal $R_I$ from an impeller speed sensor 19, a pulse signal $R_T$ from a turbine speed sensor 20, a pulse signal R from an output shaft speed sensor 21, and a signal B from a brake switch 23. The throttle sensor 18 detects the opening degree of the throttle valve 8 and generates throttle position signal TH indicative of the detected throttle opening degrees. The impeller speed sensor 19 detects the rotational speed $N_I$ of the input element of the torque converter 10 and generates pulse signal $R_I$ variable with the detected speed $N_I$. The turbine speed sensor 20 detects the rotational speed $N_T$ of the input element in the form of a turbine shaft of the torque converter 10 and generates pulse signal $R_T$ variable with the speed $N_T$. The output shaft speed sensor 21, which may be called a vehicle speed sensor, detects the rotational speed $N_O$ of the output shaft 5 and generates pulse signal R variable with the detected speed $N_O$. The brake switch 23 is turned on when a foot brake pedal 22 is depressed and generates signal B, which becomes a high level upon depression of the brake pedal 22. The antilock brake sensor 25 can detect various system functions or data, including but not limited to controller operation data, data from wheel speed sensors, data from a vehicle yaw rate sensor, data from a steering angle sensor, etc. The antilock brake sensor 25 can then generate a signal indicative of the operability of the antilock braking system, providing the controller 200 with information utilized to determine whether the lock-up clutch 24 should be engaged fully, partially, or released.

The controller 200 can process the input information and alter the speed ratio established in the transmission 40, as well as control the lock-up clutch operatively associated with the torque converter 10 by regulating the lock-up clutch control pressure.

U.S. Pat. No. 5,616,099, which is hereby incorporated in its entirety by reference, describes a lock-up type control system for a torque converter that can include an accelerator releasing detecting portion for detecting the release of an accelerator that operates the drive unit 30. A lock-up range detecting portion can detect a vehicle traveling condition falling within a lock-up range for establishing direct coupling of the input element 14 and the output element 16 of the torque converter 10 by the lock-up clutch 24. The control system can also include a lock-up progressing portion for gradually establishing a direct coupling between the input element 14 and the output element 16 of the torque converter 10 by engagement of the lock-up clutch 24 in response to the accelerator releasing detecting portion and the lock-up range detecting means, when the vehicle traveling condition enters into the lock-up range. A coasting capacity detecting portion can be provided and configured to detect the engaging capacity of the lock-up clutch as establishment of lock-up state progresses, reaching a coasting capacity required for coasting of the vehicle. In addition, a coasting capacity maintaining portion can be provided for holding the engaging capacity of the lock up clutch by interrupting the progression of engagement of the lock-up clutch when an engaging capacity corresponding to the coasting capacity is detected.

The lock-up progressing portion may be constructed to gradually establish the direct coupling of the input element and the output element of the torque converter by engagement of the lock-up clutch when the vehicle traveling condition enters into the lock-up region in response to release of the accelerator.

In the construction explained above, the torque converter generally transmits an engine output torque applied to the input element from an automotive internal combustion engine to the output element via the internal working fluid. When the vehicle traveling condition falls within a predetermined lock-up range, the input element and the output element can be directly and mechanically coupled/connected by the lock-up clutch. The power transmission unit incorporating the torque converter transmits the output torque of the engine to wheels for propelling the vehicle.

The accelerator releasing detecting portion can detect a fully released condition of the accelerator pedal. In conjunction therewith, the lock-up range detecting portion can detect whether the vehicle traveling condition falls within the predetermined lock-up range. If the accelerator is fully released and the vehicle traveling condition falls within the lock-up range, the lock-up progressing portion responds (to the outputs of the accelerator releasing detecting portion and the lock-up range detecting portion) to begin progressive engagement of the lock-up clutch for direct coupling of the input and output elements of the torque converter. When the engaging capacity reaches the coasting capacity required for coasting of the vehicle, the coasting capacity detecting portion can detect this and stop the progression of engagement of the lock-up clutch by the coasting pressure holding portion. Here, the coasting capacity may be determined in order to optimize fuel economy and engine braking effect in the coasting state of the engine. With the coasting capacity, the torque converter may be held in slip engagement state to allow a certain extent of slippage of the lock-up clutch.

Figure 2:
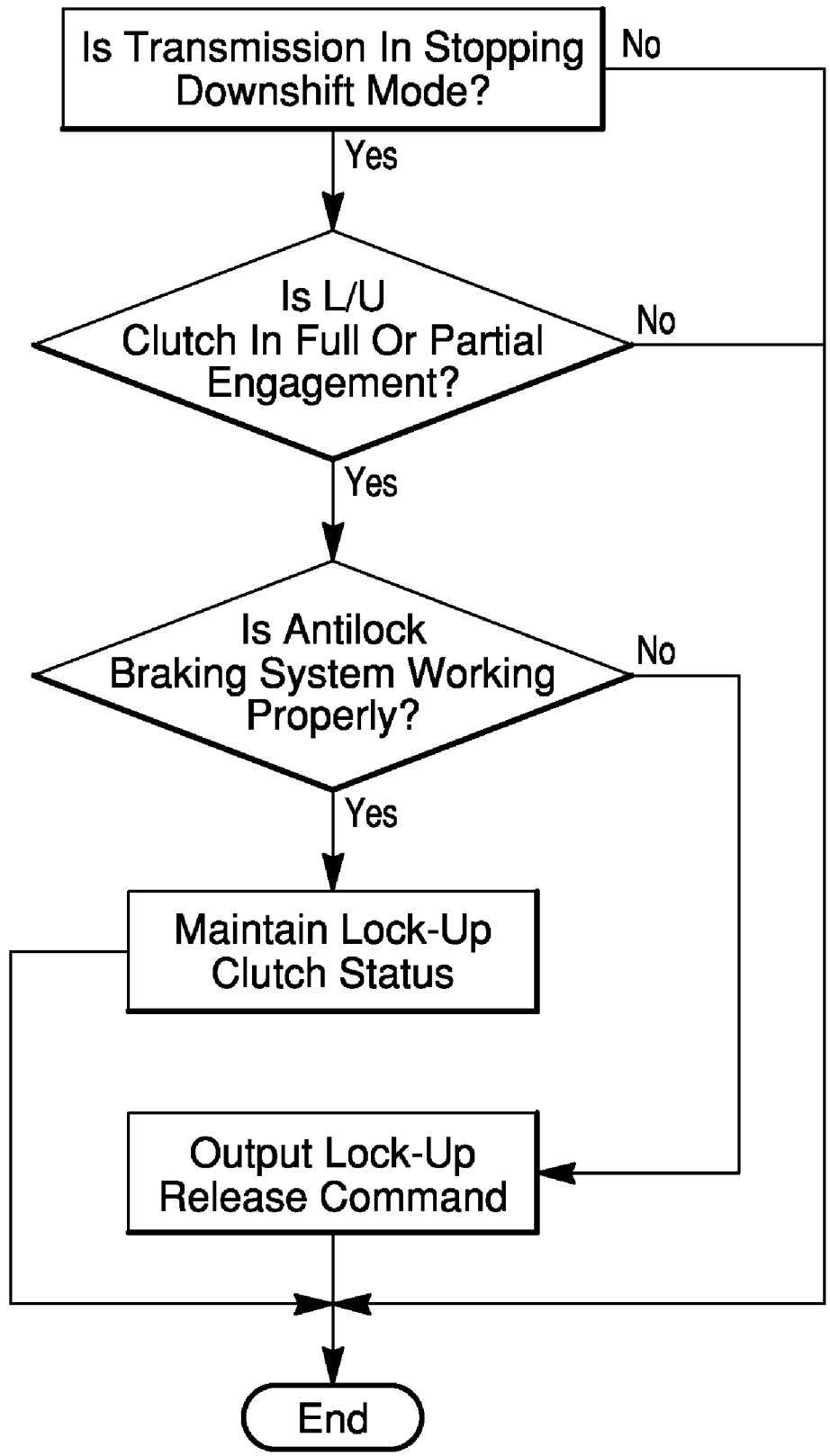
FIG. 2 is an illustration of a lock-up clutch control process.

When lock-up control is initiated in response to a transition of the vehicle traveling state into the lock-up range upon release of the accelerator pedal, the lock-up capacity can be prevented from exceeding the coasting capacity required for coasting of the vehicle. As shown in the diagram of FIG. 2, when abrupt braking of the vehicle is performed with the antilock braking system operating properly and preventing lock-up of the brakes, control of the lock-up clutch is active, and the lock-up clutch can be released partially or completely so that the engine will not stall.

Further improved fuel consumption can be achieved by broadening the lock-up region and maintaining the torque converter in a lock-up state during inertial traveling, or coasting, wherein an accelerator pedal 7 is released and the throttle opening degree is maintained at, or near, zero, thereby allowing lock-up of the torque converter down to low load and low vehicle speed conditions. Lock-up clutch pressure can be increased to maintain the torque converter in a lock-up state and prevent over-slip of the input element of the torque converter relative to the output element of the torque converter during engine braking and coasting. However, in order to avoid an engine stall when a brake pedal 22 is depressed for sudden braking and the associated antilock braking system fails, thus allowing the brakes to lock up, it is desirable to quickly reduce lock-up clutch control pressure, thereby releasing the lock-up of the torque converter and allowing the input element to rotate relative to the output element.

The controller 200 shown in FIG. 1 can include software and/or hardware that can receive and process data from an antilock brake sensor 25 that can include, but is not limited to, data from the controller, data from wheel speed sensors, data from a vehicle yaw rate sensor, data from a steering angle sensor, etc. The wheel speed sensors can be hall effect type sensor. The driveshaft can include notches (ridges and valleys) cut along its diameter which cause a pulse signal to be generated by the sensor. The steering angle sensor can use a potentiometer or variable resistor mounted on the steering shaft to encode the angle. The yaw rate sensor can operate by using a vibrating element (vibrating resonator) which, when rotated, is subjected to Coriolis' effect that causes secondary vibration orthogonal to the original vibrating direction. By sensing the secondary vibration, the rate of turn can be detected. For vibration exertion and detection the piezo-electric effect is often used, therefore vibrating gyros are often called "piezo", "ceramic", or "quartz" gyro, although in fact vibration and detection do not necessarily use the piezo effect. This type of gyro is suitable for mass production and can be almost free of maintenance. However, when it is used under external vibration, it may not be able to distinguish between secondary vibration and external vibration. This is especially true for those devices using a tuning fork or a beam (often triangular) shaped vibrating element which has solid support to the base/case. Dampers around it will not solve the problem since dampers will affect rotational motion, making the gyro's response worse. A CRS gyro has overcome this problem using a ring shaped element vibrating in squeezed oval motion up and down while the ring is suspended by spokes around it. External vibration will not cause the oval squeeze vibration mode, and the lateral only suspension by spokes around it enables the element be substantially insusceptible to linear vibrations/shocks regardless of how rigidly the CRS gyro is attached to the base.

The sensors measure whether the antilock braking system is working properly and can prevent the locking up of the brakes upon application of pressure to the brake pedal 22. The data from the sensors can be provided to the controller 200 at all times during operation of the vehicle, or at limited times such as only when the accelerator pedal 7 has been released and the vehicle is in a coasting mode. During a coasting mode, the lock-up clutch 10 can be applied in order to limit torque converter over-slip caused by engine braking. However, as discussed above, a lock-up of the brakes caused by a malfunction of the antilock braking system could cause excessive lock-up clutch control pressure and engine stalling may result. Therefore, the data provided to the controller that is indicative of a malfunction of the antilock braking system can be used to partially or completely reduce or release the lock-up clutch control pressure.

While certain embodiments of the invention are described above, it should be understood that the invention can be embodied and configured in many different ways without departing from the spirit and scope of the invention. For example, the sensors encompassed by the representative antilock braking sensor 25 shown in FIG. 1 can include other or different sensors than those described above. The transmission 40 can be a continuously variable type transmission (CVT), a standard transmission having fixed gear ratios, and possibly an automated manual transmission, an automatic transmission having fixed gear ratios, etc. The control of the lock-up clutch operatively associated with the torque converter can be performed by electrical solenoids such as lock-up solenoid 117, a lock-up clutch control pressure regulator, etc.

While the subject matter has been described in detail with reference to exemplary embodiments thereof, it will be apparent to one skilled in the art that various changes can be made, and equivalents employed, without departing from the scope of the invention.

What is claimed is:

1. A system for controlling a power train of a vehicle, comprising:
   a drive unit;
   a transmission having an input, an output, and a plurality of gears, the output operatively coupled to at least one wheel on the vehicle, the at least one wheel having brakes;
   a torque converter having an input operatively coupled to the drive unit and an output operatively coupled to the input of the transmission, the torque converter having a lock-up clutch;
   a lock-up clutch control device operatively connected to the lock-up clutch;
   an antilock braking system configured to prevent locking of the at least one wheel on the vehicle during application of the brakes to the at least one wheel when the antilock braking system is functioning properly; and
   a controller configured to determine whether a condition is present in which the antilock braking system is not functioning properly, and upon determination that the antilock braking system is not functioning properly, controlling the lock-up clutch control device to at least partially disengage the lock-up clutch;
   wherein the plurality of gears include a gear having a lowest gear ratio and a gear having a second to lowest gear ratio, and the controller determines whether the antilock braking system is working properly during a downshift between the gear having the lowest gear ratio and the gear having the second lowest gear ratio in the transmission.

2. The system of claim 1, wherein the lock-up clutch control device includes a lock-up clutch control pressure regulator, and the controller causes the regulator to reduce the lock-up clutch control pressure to zero upon determination that a condition is present in which the antilock braking system is not functioning properly.

3. The system of claim 1, wherein the lock-up clutch control device includes a lock-up clutch control pressure regulator, and the controller causes the regulator to reduce the lock-up clutch control pressure to zero upon determination that a condition is present in which the antilock braking system is not functioning properly and the at least one wheel is locked during application of the brakes to the at least one wheel.

4. The system of claim 1, wherein the controller determines whether the antilock braking system is working properly during a downshift of the gears in the transmission with the vehicle in a coasting condition.

5. The system of claim 1, further including at least one sensor operatively associated with the antilock braking system and adapted to output data indicative of one of a proper operation and improper operation of the antilock braking system, wherein the controller includes at least one of hardware and software capable of receiving data from the at least one sensor, processing the data, and utilizing the results of the processing of the data to control the lock-up clutch.

6. The system of claim 1, wherein the lock-up clutch control device includes an electrical solenoid.

7. The system of claim 6, wherein the lock-up clutch control device is configured to release the lock-up clutch.

8. The system of claim 1, wherein the controller controls the lock-up clutch control device during a coasting condition of the vehicle.

9. A method for controlling the power train of a vehicle comprising:
  providing a drive unit, a transmission having an input and an output, the output operatively coupled to at least one wheel on the vehicle, the at least one wheel having brakes, a torque converter having an input operatively coupled to the drive unit and an output operatively coupled to the input of the transmission, the torque converter having a lock-up clutch, an antilock braking system capable of preventing locking of the at least one wheel on the vehicle during application of the brakes to the at least one wheel when the antilock braking system is functioning properly, a lock-up clutch control device, and a controller;
  determining with the controller whether a condition is present in which the antilock braking system is not functioning properly;
  determining with the controller whether the at least one wheel is locking during application of the brakes to the at least one wheel; and
  upon determination that the antilock braking system is not functioning properly and the at least one wheel is locking during application of the brakes to the at least one wheel, controlling the lock-up clutch control device to at least partially disengage the lock-up clutch.

10. The method according to claim 9, further comprising:
  providing a lock-up clutch control pressure regulator;
  determining with the controller whether the at least one wheel is locked during application of the brakes to the at least one wheel; and
  controlling, via the controller, the lock-up clutch control pressure regulator to produce a lock-up clutch control pressure substantially equal to zero upon determination that a condition is present in which the antilock braking system is not functioning properly and the at least one wheel is locked during application of the brakes to the at least one wheel.

11. The method according to claim 9, further comprising:
  controlling, via the controller, the lock-up clutch control device to gradually disengage the lock-up clutch upon determination that a condition is present in which the antilock braking system is not functioning properly.

12. The method according to claim 9, further comprising:
  determining, with the controller, whether the at least one wheel is locked during application of the brakes to the at least one wheel; and
  controlling, via the controller, the lock-up clutch control device to at least partially disengage the lock-up clutch upon determination that a condition is present in which the antilock braking system is not functioning properly and the at least one wheel is locked during application of the brakes to the at least one wheel.

13. The method according to claim 9, further comprising:
  providing at least one sensor operatively associated with the antilock braking system;
  outputting data, via the at least one sensor, indicative of one of a proper operation and an improper operation of the antilock braking system;
  receiving, via the controller, the data, and utilizing the data to control the lock-up clutch control device.

14. The method according to claim 9, wherein,
  controlling the lock-up clutch control device occurs during a coasting condition of the vehicle.

15. The method according to claim 9, wherein,
  providing includes providing the transmission with a plurality of gears including a gear having a lowest gear ratio and a gear having a second to lowest gear ratio, and
  controlling the lock-up clutch control device occurs during downshifting from the gear having the lowest gear ratio to the gear having the second to lowest gear ratio.

16. A system for controlling a power train of a vehicle, comprising:
  a drive unit;
  a transmission having an input and an output, the output operatively coupled to at least one wheel on the vehicle, the at least one wheel having brakes;
  a torque converter having an input operatively coupled to the drive unit and an output operatively coupled to the input of the transmission, the torque converter having a lock-up clutch;
  an antilock braking system configured to prevent locking of the at least one wheel on the vehicle during application of the brakes to the at least one wheel when the antilock braking system is functioning properly; and
  means for determining whether a condition is present in which the antilock braking system is not functioning properly and the at least one wheel is locked during application of the brakes to the at least one wheel, and upon determination that the antilock braking system is not functioning properly and the at least one wheel is locked during application of the brakes to the at least one wheel, at least partially disengaging the lock-up clutch.

17. The system of claim 5, further including an impeller speed sensor, a turbine speed sensor, an airflow sensor, a wheel speed sensor, a yaw rate sensor, and a steering angle sensor, wherein the yaw rate sensor and the steering angle sensor are operatively associated with the antilock braking system and adapted to output data indicative of one of a proper operation and an improper operation of the antilock braking system.

18. The system according to claim 1, wherein the plurality of gears includes a first gear, a second gear, a third gear, a fourth gear, and a fifth gear, wherein the fourth gear includes the second to lowest gear ratio and the fifth gear includes the lowest gear ratio.

19. The method according to claim 13, further comprising:
  providing an impeller speed sensor, a turbine speed sensor, and an airflow sensor are operatively associated with the controller, wherein providing at least one sensor includes providing a wheel speed sensor, a yaw rate sensor, and a steering angle sensor.

20. The system according to claim 16, further comprising:
an impeller speed sensor, a turbine speed sensor, an airflow sensor, a wheel speed sensor, a yaw rate sensor, and a steering angle sensor, wherein each of the impeller speed sensor, the turbine speed sensor, the airflow sensor, the wheel speed sensor, the yaw rate sensor, and the steering angle sensor are operatively associated with the means for determining.

* * * * *